Feb. 12, 1929.
A. S. ALEXANDER
1,701,940
TIRE MIRROR
Filed Jan. 30, 1928
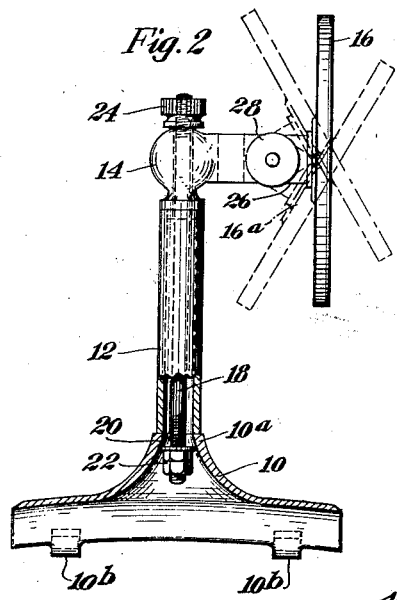
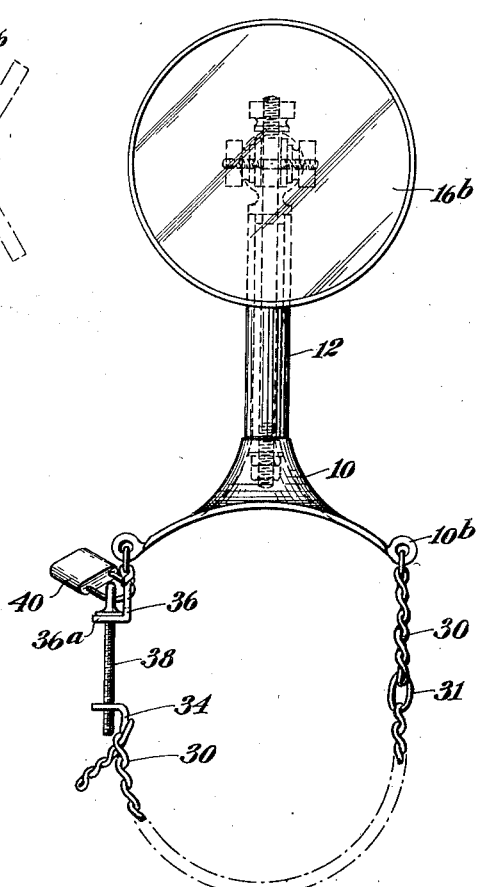
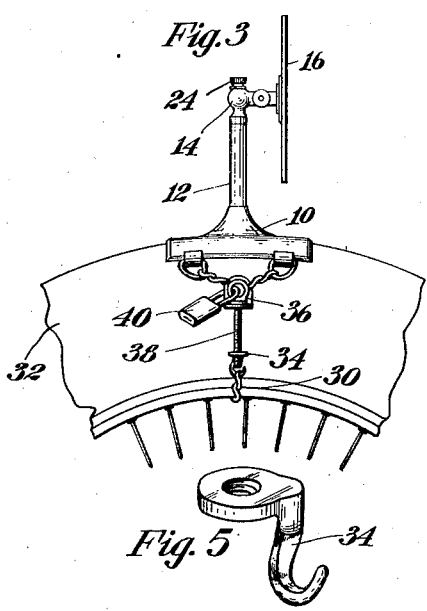
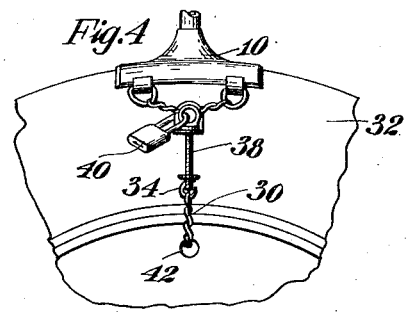
INVENTOR.
Arthur S. Alexander,
BY
ATTORNEYS.

Patented Feb. 12, 1929.

1,701,940

UNITED STATES PATENT OFFICE.

ARTHUR S. ALEXANDER, OF BROOKLYN, NEW YORK, ASSIGNOR, BY MESNE ASSIGN-
MENTS, OF ONE-HALF TO WILLIAM McGRATH AND ONE-HALF TO ARTHUR S.
ALEXANDER, BOTH OF BROOKLYN, NEW YORK.

TIRE MIRROR.

Application filed January 30, 1928. Serial No. 250,364.

This invention relates to improvements in rearview mirrors and their attachment on automobiles or similar vehicles and more particularly relates to the attaching means to be used with such a rearview mirror in conjunction with the spare tire when carried on the side of the automobile or other vehicle.

It has become customary in many of the present day automobiles to mount the spare tire on the side of the automobile usually adjacent the front fenders, and it is a feature of this invention to mount a rearview mirror on the spare tire when carried adjacent the front fenders on the side of the vehicle so that the driver of the vehicle may see traffic conditions to the rear.

It is another feature of this invention to secure a mirror together with its support to a spare tire or a wheel in such a manner that it will be securely fastened thereto preventing loss, looseness or theft.

It is another feature of this invention to provide securing means for securing the mirror to either a spare tire in its unmounted position or as mounted on any of the common forms of automobile wheels.

It is still another object of this invention to provide a rearview mirror to aid the operator in observing conditions behind the vehicle in which the mirror is supported adjacent the operator and in which the securing means does not detract from the usual attractive appearance of the vehicle.

Further objects and advantages of the invention will appear from the following disclosure thereof together with the attached drawings which illustrates a preferred form of embodiment thereof, and in which;

Figure 1 is the front elevation of a rearview mirror together with its attaching chain and turnbuckle and in which the support is shown in phantom lines;

Figure 2 is a side elevation of the mirror shown in Figure 1 with parts in section to more clearly show the internal construction;

Figure 3 is a side elevation of the mirror attached to a wire wheel;

Figure 4 is a side elevation of the mirror support and attaching chain attached to a disc wheel;

Figure 5 is a perspective detail of the hook to which the chain is attached.

The mirror comprises a curved base 10, post 12, adjustable head 14 and reflector 16. The base 10 may be made of any substantially rigid material and is slightly curved to closely fit the periphery of a spare tire. The base 10 is usually heavily nickel plated or similarly coated for the purpose of presenting an attractive appearance and additionally to prevent rust.

The post 12 which projects from a centrally upstanding portion $10^a$ of the base 10 is tubular and similarly nickle plated or otherwise coated to correspond with the base 10. This post is centrally bored to receive the bolt 18 which projects from end to end of the post 12 and extends into the base 10 through the lug 20 and is provided with a nut and lock nut 22. The bolt 18 also extends from the other end of the post 12, through the head 14, and is provided with a knurled nut 24 which is used for the purpose of adjustment. The head 14, being pivoted on the bolt 18 is merely held by friction in contact with the post 12. When the nut 24 is loosened, the head 14 is loosened. This permits adjustment of the mirror in one plane after which adjustment, the head may be secured in any position by tightening the nut 24.

The reflector 16 comprises a metallic back $16^a$ which is provided with upstanding lugs 26 pivoted to the extension of the head 14. A glass $16^b$ may be suitably silvered to act as a mirror and it may or may not be flat depending upon whether the simple reflector or reducing reflector is desired. When the plain glass is provided for reflecting, the conditions behind the vehicle will appear in the true size while the reduced size will be shown in a curved glass. Knurled screws 28 are provided for permitting the adjustment of the mirror in this plane which is perpendicular to the plane of the first adjustment. It will thus be obvious that the reflector 16 may be universally adjusted with respect to its support.

In order to attach the mirror to a suitable support, the base 10 is provided with eyelets $10^b$. A chain 30 is attached to two adjoining eyelets $10^b$ preferably by short sections and the length of the portion 31 of this chain is such that it extends around underneath the tire 32 and then upward in contact with the hook 34. The adjoining eyelets $10^b$ on the other side of the mirror base are similarly connected by a length of chain also substantially in V shape and they are joined by a link or ring 36. The ring 36 is provided with a right angle projection 36ª suitably perforated to receive a turnbuckle or screw 38. A hook 34 is suitably threaded to cooperate with the screw eyelet 38 and upon being turned the hook 34 may be drawn toward the ring 36 and the chain tightened about the tire. When the chain has been sufficiently tightened, the lock 40 may be hooked through the eye of the screw 38 and the perforation in the ring 30 to hold the screw in position and prevent loosening of the chain 30.

It will be understood that the chain 30 is a suitable link chain and the links are of such nature that when the turnbuckle or screw 38 is substantially extended to its greatest length, the most appropriate link in the chain will be passed over the hook 34. In other words, all slack will be taken up in the chain 30 before the turnbuckle is tightened and then to tighten the chain and prevent the removal of the link from the hook 34 the turnbuckle will be screwed tight and the lock will be fastened in place, and to the end of the surplus chain.

Inasmuch as the chain fits so very close to the tire and inasmuch as the difference in height between the upper end of the hook and the U part of the hook is so great that when the link 38 is tightened to its limit, it will be absolutely impossible to unhook the chain from the hook and it will be impossible to remove the mirror in any manner from the tire except by first unlocking and then turning the screw 38.

As shown in Figure 3 it is customary in some cases to mount an entire wheel and tire on the fenders of an automobile. In such cases with either the wire wheel or with the wood wheel or with only the tire mounted on a rim, the chain is of such length that it will extend underneath the rim and in case there are spokes, between the spokes and then brought up on the other side of the tire to the hook 34. In any case there is sufficient chain to be passed around the solid portion of the tire and rim to permit the mirror to be securely fastened and locked.

As shown in Figure 4, the mirror may also be attached to a tire mounted on a disc wheel. The disc wheels are provided with a hole 42 for the tire valve. Inasmuch as the chain 30 is flat and only of sufficient size to adequately secure the mirror, it has been found that the usual hole 42 is adequate to permit the chain to be passed therethrough, thereby allowing the mirror to be attached to a disc wheel mounting.

It will be understood that the chain 30 as well as the hook 34, turnbuckle 38, lock 40 and all other parts will be similarly nickel plated to present a pleasing appearance and to add to the usual beauty of the motor vehicle. It will also be understood that the formation of the hook 34, link 36 and turnbuckle 38 are so arranged that a very simple but very efficient and very secure locking means is provided. There is sufficient adjustment provided for the necessary differences in sizes of the tire or of the tire and rim and the major adjustment may be taken up by different links in the chain while the subsequent tightening is provided in the turnbuckle 38. The V shape of the connecting parts of the chain 30 with the eyelets $10^b$ on the base 10 provide a secure foundation and support for the mirror preventing slip and preventing jar or vibration. It also does away with the necessity of several chains together with the cumbersome locks and adjustment means. The structure shown herein also obviates the necessity of using straps or other forms of flexible means which can not be secured to lock the mirror to the tire and consequently do not prevent theft. The prior forms of mirror support are also not readily adjustable as a strap stretches and there is no means for taking up the small differences in length between the holes and with the inadequacy of fine adjustment the mirrors vibrate, become loose and shake which brings about conditions of annoying noise and difficult vision. With the present device the adjustment is extremely fine due to the screw thread on the turnbuckle and the mirror may be positively secured to any and all forms of spare tire mountings.

While I have shown and described a preferred form of embodiment of this invention I am well aware that other modifications may be made and I therefore desire a broad interpretation of the invention within the scope and spirit of the disclosure herein and the claims appended hereto.

I claim:

1. As an article of manufacture, a rear view mirror, a base supporting said mirror, a flexible means permanently secured on one end to one side of said base, a flexible means permanently secured to said base on the other side, slack take-up means to secure said flexible means together and means to lock said last means in any adjusted position.

2. As an article of manufacture, a tire mirror for enabling the vehicle operator to see to the rear of the vehicle, means to secure said mirror to a spare tire, said means including a flexible chain, a turnbuckle, a hook on said turnbuckle to engage any link of the chain and a lock to prevent loosening of the turnbuckle to secure said mirror on the tire against theft.

3. An article of manufacture, a rearview mirror to be mounted on a spare tire adjacent the side of an automobile, said spare tire being mounted on a disc wheel, the mirror being provided with a curved base to fit the periphery of the tire, eyelets on the sides of said base, a flexible chain attached to an eyelet on one side of said base, another chain fastened to an eyelet on the other side of said base, said chain being of a size to pass through the normal valve opening in said disc wheel, and adjustable means to secure said chains together around said spare tire, and means to lock said securing means in any adjusted position.

4. An article of manufacture, a rearview mirror provided with a base curved to engage the periphery of a spare tire, eyelets on the side of said base, a short portion of flexible chain attached to eyelets on one side of the base, a longer length of flexible chain attached on the other side of said base, a turnbuckle and hook attached to the short length of chain, said hook being adapted to engage any link in the long portion of the chain, the turnbuckle being adjustable to remove the remainder of the slack in the chain and locking means to secure said turnbuckle in any adjusted position.

5. An article of manufacture, a rearview mirror comprising a base, a post, a reflector adapted for universal adjustment with respect to said post, and a chain for securing said mirror, said chain securing means comprising a long portion of chain and a short portion of chain and an adjustable screw and a hook attached to one portion of said chain and being detachably and adjustably secured to said other portion of said chain and means to retain said securing means in any adjusted position, said last mentioned means comprising a screweye in the end of said adjustable securing means, a link in said short portion of said chain and a padlock hooked through said screweye and the said link.

6. An article of manufacture, a rearview mirror to be supported on a spare tire, said mirror being provided with a base supported by the periphery of the tire, eyelets in the respective four corners of said base, short lengths of chains attached to the respective eyelets, links joining the short lengths of chain on each side, and forming V shaped sections, a long length of chain sufficient to extend under the tire rim, attached to one of the joining links, means to secure said long length of chain to the other joining link to secure said mirror on the vehicle, and means to lock the ends of said chain together.

In testimony whereof I have affixed my signature to this specification.

ARTHUR S. ALEXANDER.